United States Patent [19]

Thiel et al.

[11] 4,234,530
[45] Nov. 18, 1980

[54] METHOD FOR THE MANUFACTURE OF THIN-WALLED SHAPED ARTICLES OF CRYSTALLINE THERMOPLASTIC MATERIAL

[76] Inventors: Alfons W. Thiel, Uferstrasse 15, Mainz; Barbara Geppert, Schonbergstrasse 75, Wiesbaden, both of Fed. Rep. of Germany

[21] Appl. No.: 946,393

[22] Filed: Sep. 27, 1978

Related U.S. Application Data

[63] Continuation-in-part of Ser. No. 818,876, Jul. 25, 1977, abandoned.

[51] Int. Cl.³ ................................................ B29F 3/08
[52] U.S. Cl. .................................... 264/151; 264/522; 264/153; 264/210.5; 264/237; 264/322; 264/327
[58] Field of Search ................... 264/327, 210 R, 553, 264/519-522, 210.5, 544, 551, 151, 153, 237, 322; 425/404, 445

[56] References Cited

U.S. PATENT DOCUMENTS

| | | | |
|---|---|---|---|
| 2,642,627 | 6/1953 | Mann et al. | 264/327 |
| 3,157,719 | 11/1964 | Ferrari | 264/553 |
| 4,039,609 | 3/1977 | Thiel et al. | 264/171 |
| 4,086,045 | 4/1978 | Thiel et al. | 425/404 |

*Primary Examiner*—Jeffery R. Thurlow
*Attorney, Agent, or Firm*—Le Blanc, Nolan, Shur & Nies

[57] ABSTRACT

A method for manufacturing thin-walled articles from crystalline thermoplastic material comprising the steps of extruding a continuous web of hot crystalline thermoplastic material at an extrusion temperature above the crystalline melting temperature range of the material, substantially immediately rapidly precooling the opposite surfaces of the web to form therealong thin supportive layers having a temperature in the range wherein the said material is not further plastically deformable and wherein further growth of crystals is essentially avoided, while the hotter core material between said layers is cooled to a temperature adjacent to but above the crystalline melting temperature range and is held in a substantially crystal free condition, transporting the so precooled web into a thermoforming station within a sufficiently short time period to essentially maintain over the web thickness the above mentioned temperature profile produced by precooling, and then thermally forming at a rapid cooling rate said web to an article of desired shape to essentially control growth of crystals in said material while cooling down through the crystalline melting temperature range.

18 Claims, 14 Drawing Figures

METHOD FOR THE MANUFACTURE OF THIN-WALLED SHAPED ARTICLES OF CRYSTALLINE THERMOPLASTIC MATERIAL

This is a continuation-in-part of Ser. No. 818,876 filed July 25, 1977, now abandoned.

This invention relates to the manufacture of thin-walled articles such as cups, plates and the like containers, of synthetic crystalline thermoplastic material, and particularly to special method steps important in connection with the crystalline character of the used thermoplastic material.

In manufacturing thin-walled articles by thermal forming of crystalline thermoplastic material sheets or webs it is known from U.S. Pat. No. 3,709,976 to heat the cold web to a temperature of 6° to 30° C., preferably 6° to 17° C., below the crystalline melting range. This would be for instance for polypropylene a temperature of about 150° to 165° C. But such a known method has the principal defect that the sheets or webs of crystalline thermoplastic material must be heated from outside so that the outer surface regions of the sheets or webs are heated much more than the inner core portions so that to heat the inner core portion to within the crystalline melting point range it is necessary to heat the outer surface regions of the webs or sheets very much higher than the crystalline melting point; or if heating the outer surfaces above the crystalline melting temperature range is to be avoided the inner core material remains relatively cool and in a condition in which it is only elastically deformed. The articles shaped by such a method therefore do not have satisfactory dimensional stability under heat.

In a similar method known by U.S. Pat. No. 3,157,719 polypropylene is extruded and separated in sheet-form and cooled down practically to the room temperature in order to be subjected for a short period to a preliminary heat treatment at a temperature of about 130° to 140° C. In order to shape articles such polypropylene sheets are transported sheet by sheet directly adjacent to the shaping tool and each one of the sheets is subjected to the combined action of a second heating stage up to the softening temperature of the polypropylene and simultaneously applying vacuum to the tool in order to draw the softened sheet in contact with the tool surface. But it is impossible to control growth of crystals in the polypropylene during this type of thermal forming, because softening the material involves heating it up to a temperature within or higher than the critical crystalline melting temperature range of the material. On the other hand shaping by drawing the sheet in contact with a tool surface does not involve cooling down the material through the critical crystalline melting temperature range at a sufficiently high cooling rate to permit control or avoid growth of crystals in the material.

In view of these known methods the technical problem solved by the invention was to provide satisfactory conditions for thermal forming with the special character of the crystalline thermoplastic material used to be thermoformed in order to control growth of crystals in the material during the entire process. Such control may substantially avoid growth of crystals or may allow controlled growth of crystals to a desired extent.

According to the present invention a web or sheet of crystalline thermoplastic material to be thermoformed is subjected to special temperature conditioning which involves providing at the inner core of the said web or sheet a temperature higher than the upper limit of the critical crystalline melting temperature range for the material and providing at the outer surface regions of the web or sheet a temperature lower than the lower limit of the critical crystalline melting temperature range for the material, and that in the thermoforming step the thermoplastic material in the core of the web or sheet or in the shaped article wall, respectively, in combination with the reducing thickness of the web or sheet and subsequently of the reducing thickness is rapidly cooled down through the critical crystalline melting temperature range while controlling growth of crystals in the core material.

According to the present invention temperature conditioning of the crystalline thermoplastic material involves providing a special temperature profile in the web or sheet to be thermoformed. Such special temperature profile provides that the inner core material of the web or sheet is brought to a temperature for thermoforming which is higher than the upper limit of the critical crystalline melting temperature range of the respective material, whereas the outer surface regions of the web or sheet are brought to a temperature which is lower than the said critical crystalline melting temperature range. By providing such temperature profile it is possible to control or substantially avoid growth of crystals in the outer surface regions of the web or sheet whereas the inner core material is in a condition practically free of crystals. By the combined action of substantial reducing in sheet or web thickness with accompanying rapid cooling it is possible to control growth of crystals during the thermoforming step positively. So it is possible to obtain outer surface layers of the article wall having more or less fine crystalline structure and an inner core region of the article wall having a predetermined controlled crystalline structure. If the outer surface layers are not reheated before the web or sheet enters the thermal forming step a substantial stretching effect is obtained during the thermal forming step within the outer surface regions. Such stretching in the outer surface regions of the article wall for many cases may have special advantages e.g., the material brittleness is very much reduced in the outer layers of the article wall and so the mechanical behavior of the article is very much improved.

On the other hand cooling down the core material during the thermal forming step is performed in combination with a substantial reduction of wall thickness. Thereby it is possible to obtain relatively rapid cooling down through the critical crystalline melting temperature range although the said crystalline thermoplastic material has a very low thermal conductivity. The combined action of reducing the wall thickness by thermal forming and cooling the thermally formed wall surfaces results in improved control of cooling conditions through the critical crystalline melting temperature range and therefore also an improved control of the growth of crystals in the inner core region of the article wall.

By such effect on the one hand the mechanical behavior of the core region of the article wall becomes controllable. But on the other hand a relatively high shaping temperature of the core material can be used in order to get articles having high dimensional stability under heat. Further it is a special advantage of such articles, the outer surface layers of which are in a stretched condition, that the inner core region of the article wall has desired stiffness and stability in shape under heat while the stretched outer surface regions of the article are tough, and therefore improved in its mechanical conditions. So the articles manufactured in accordance with the present invention obtain wall conditions in which an increased elastic modulus and an increased impact strength in the outer surface regions of the article wall are combined with an increased stiffness and thermal stability in the core region of the article wall. Further the invention has special advantages for the method itself due to the fact that the rapid temperature transfer through the critical crystalline melting temperature range is obtained in combination with reducing the wall thickness during the thermal forming step. Therefore it is possible to work with relatively thick webs or sheets in the present method, for instance such webs or sheets having thickness more than three millimeters.

In the present novel method the temperature provided at the core material of the web or sheet may be close to but higher than the upper limit of the critical crystalline melting temperature range of the crystalline thermoplastic material. When using this feature, cooling down the core material through the critical crystalline melting temperture range may be substantially improved.

Further in the present novel method the temperature provided at the outer surface region of the web or sheet may be close to but lower than the lower limit of the critical crystalline melting temperature range of the crystalline thermoplastic material.

The present novel method for manufacturing thin-walled articles from crystalline thermoplastic material by thermoforming may be performed in different embodiments. One embodiment of the novel method may provide that the temperature conditions for thermoforming includes heating a web or sheet of thermoplastic material throughout to a temperature higher than the upper limit of its critical crystalline melting temperature range and cooling down under predetermined cooling rate conditions the outer surface regions of the said web or sheet to a temperature lower than the lower limit of the critical melting temperature range, the cooling down rate conditions being selected and adapted for controlling growth of crystals in the material of the outer surface regions of the web or sheet.

In such embodiment of the invention two different steps for cooling down through the critical crystalline melting temperature range may be provided, namely a first one for cooling down the outer surface regions of the web or sheet by a precooling and the second one for cooling down the inner core material during the thermal forming step. By these two separate cooling steps an improved and a more precise temperature control is possible. The fact that the first cooling step precools the web at its surface regions and the second cooling step cools the core material after reducing the wall thickness to obtain the thin article wall, renders the combination of both of these cooling steps highly effective.

The preferred embodiment of the present novel method is characterized by an uninterrupted sequence of steps comprising:
(a) extruding a continuous web of hot crystalline thermoplastic material at a conventional extrusion temperature above the crystalline melting temperature range of the material,
(b) substantially immediately rapidly precooling the opposite surfaces of said web to form along those surfaces thin supportive layers having a temperature in the range wherein the material is not further plastically deformable and wherein further growth of crystals is essentially avoided, while the hotter core material between the outer layers is cooled to a temperature adjacent to but above the crystalline melting temperature range and is held in a substantially crystal free condition,
(c) transporting the so pre-cooled web into a thermoforming station within such a short time period as to essentially maintain the temperature profile produced by precooling over the web thickness,
(d) and then thermally forming the web at rapid cooling rate conditions to an article of desired shape to essentially control growth of crystals in the material while cooling through the crystalline melting temperature range under the cooling rate conditions.

Such preferred embodiment combines the technical advantages of a highly effective inline method of production with the special measures and precautions needed to avoid or to control growth of crystals during the method steps when the said crystalline thermoplastic material is cooled down through the said critical temperature range. so-called in-line methods are known from U.S. Pat. No. 4,039,609. The principles of such known inline processes comprise plasticizing thermoplastic material, preferably of granular kind, by heating and compressing in an extruder press, casting the said material by a coat hanger or like nozzle to form a web and precooling the web for stabilizing to make the web capable of being transported to a thermal forming station, and thereafter thermally forming the web to shape the desired articles. Such known inline processes are highly effective for manufacturing articles but they involve the necessity to cool down the thermoplastic material from its extrusion temperature to the normal room temperature during one or more stages of the process. In the known in-line methods such cooling down does not embody any control of the crystal growth in the material if crystalline thermoplastic material is used in such a process. Therefore it is a special advantage of this preferred embodiment of the invention to introduce a special cooling condition at the precooling and stabilizing stage and at the thermoforming stage of the known in-line process such that the high effectiveness of the in-line process is fully retained and all necessary measures and precautions to control the growth of crystals in the material become fully effective in the in-line process.

One special possibility for the preferred embodiment of the present method is to substantially maintain the temperature profile of the web as produced by pre-cooling until the web is subjected to the thermal forming step. But for other purposes it is possible to reheat the surface regions of the web so to get a temperature which is adjacent to but lower than the lower limit temperature of the crystalline melting temperature range. Such possibility is advantageous for shaping articles which have somewhat difficult surface shape. Thus the surface material gets somewhat more ductility for thermal forming. But the crystalline condition of the surface material is not changed by such reheating. Such reheating may be applied to one or both of the surfaces. A further possibility is reheating one or both of the web surfaces to a temperature within or above the crystalline melting range. But when thus reheating, the crystalline conditions of the surface material regions are changed and the surface regions must be rapidly cooled down through the critical crystalline melting temperature range during the thermal forming step. These variations using surface reheating may for example be advantageous for forming of parts with very sharp corners, which would tend to be rounded by toughly elastic skins. In the case of reheating surface layers above the critical crystalline melting temperature range of the material, sag problems have to be faced. But the advantage of avoiding long heating times and more precise and uniform temperature control for many cases is more important than using precautions with respect to sag problems.

Cooling means in the pre-cooling step as well as in the thermal forming step may be used as optimum for each special material and case. Thus it is possible for pre-cooling to use contact of the web surface with cooled surface means having good and high heat conductivity. During the thermal forming step additional cooling means can be provided for the other surface of the article if only one cooled shaping tool surface is provided for one surface of the article wall. In each case for instance powdered dry ice may be blown into the other side of the web during the thermal forming step.

Several possibilities to practice the process according to the present invention are disclosed in connection with the enclosed drawings. In these drawings FIG. 1 is a diagrammatic view showing a first possibility of the method for shaping thin-walled articles from crystalline thermoplastic material in which the transfer time period between the stabilizing and thermoforming steps of the web is minimized;

Figure 1:
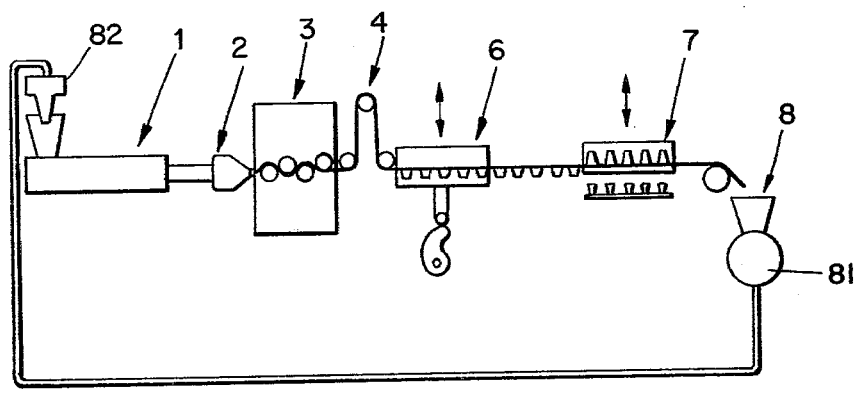
Figure 2A:
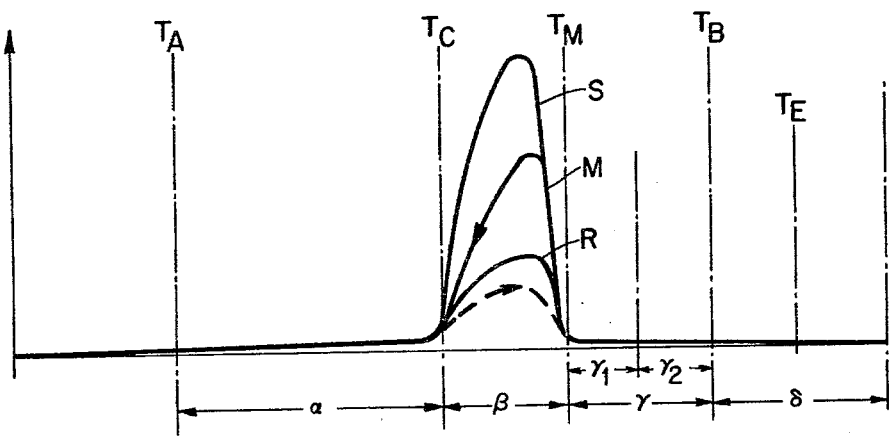
FIGS. 2A and 2B are graphic views illustrating temperature relationships in the crystalline thermoplastic material according to the method illustrated in FIG. 1.
Figure 2B:
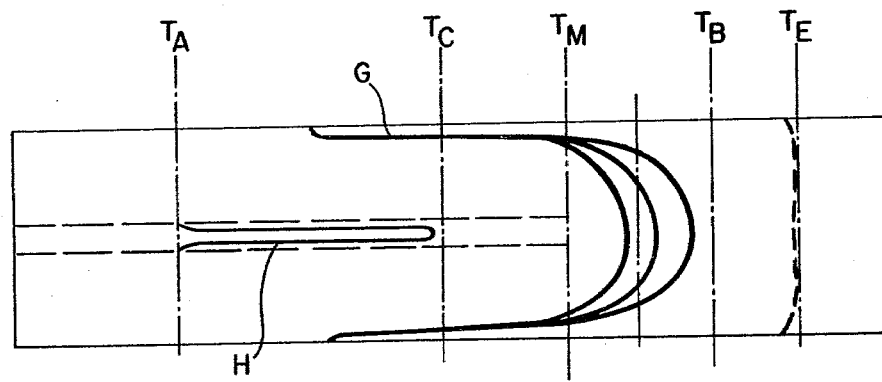

FIGS. 1, 2A and 2B illustrate the operational sequence of a preferred embodiment of the method for manufacture of thin-walled articles from crystalline thermoplastic material. This embodiment comprises an extrusion device 1 suitable for receiving granular crystalline thermoplastic material and compressing and heating it continuously until liquified and reaches a temperature $T_E$ above the crystalline melting temperature range $\beta$ of the material. The liquified thermoplastic material, processed by the extrusion press 1, is conveyed into a coat hanger nozzle 2 having a broad outlet slot, the upper and lower wall of which may be additionally provided with temperature regulators.

The hot liquified thermoplastic material continuously flowing out from said coat hanger nozzle 2 forms a hot plastic web I, which is immediately fed to a stabilizing station 3, which may for example be constructed as a sequence of cooled metallic rollers providing effective contact of the cooled roller surfaces with the surfaces of the plastic web I. So in such stabilizing station 3 the web is stabilized by pre-cooling its opposite surfaces in such manner that thin solidified supportive layers of said thermoplastic material will be provided at those surfaces whereby the web becomes self supporting. But in view of the low heat conductivity of the thermoplastic material the inner core material of the web remains relatively hot and in any case a temperature which is above the crystalline melting temperature range $\beta$ of the material.

Pre-cooling is done very rapidly, so that the crystal nuclei contained in the material have not time to grow substantially. Therefore the material of the solidified outer supportive layers of the web attains a very fine crystalline structure during the pre-cooling step. As the inner core material of the web remains at a temperature above the crystalline melting temperature range there will be some transition regions between said inner core and the outer layers in which the temperature conditions are so that some growth of crystals may occur. But by pre-cooling very rapidly such transition regions may be very thin and have practically no effect.

If desired for any reasons in this first embodiment of the method pre-cooling may be done less rapidly. When pre-cooling in such manner, some growth of crystals will be permitted to occur in the outer supportive layers material. It is thus possible to control growth of the crystals in the outer layers according to the rate of pre-cooling used.

From stabilizing station 3 the continuously advanced web is fed to a motion control feed conversion device 4 for converting the continuous advance of the web into an intermittent advance. Such feed conversion device 4 may be constructed as known from U.S. Pat. No. 4,039,609.

The web emerging from the motion control feed conversion device 4 is immediately introduced to a thermal forming station 6 containing thermal forming means which may be constructed as known from U.S. Pat. No. 4,039,609 and fragmentary and schematically shown in FIGS. 4a and 4b herein. During such thermal forming operation the pre-cooled outer supportive layers are shaped substantially by stretching deformation whereas the almost plastic material of the web core will be plastically deformed and distributed between the stretch-formed outer layers. During and after such mechanical shaping involving substantial stretching of the outer supportive layers and plastically deforming and distributing the hot plastic core material between the outer layers, the shaped web or article wall, respectively, is rapidly cooled in order that growth of crystals in the cooling core material may be controlled or minimized. If desired such cooling rate may be somewhat slower to control the growth of the crystal in the core material in any desired manner.

In connection with the said first embodiment of the method it is important to minimize the time period which any part of the web requires in order to be transported from the stabilizing step to the thermal forming step. By such minimizing of the transport time period between the stabilizing and the thermal forming steps, the temperature conditions or the temperature profile respectively as produced by the stabilizing steps are practically maintained until cooling in the thermal forming step begins. It is thus possible to control the growth of the crystals in the web material during the transport time period if a temperature profile of the web is produced in the pre-cooling step such that the core material temperature is above the crystalline melting temperature range of the material so that the core material is in a plastic state in which no growth of crystals occurs, whereas the temperature of the outer layers is below the lower limit of the critical crystalline melting temperature range so that further growth of crystals in the outer layer material does not occur.

FIGS. 2A and 2B are graphics to illustrate the foregoing temperature relationship and the special temperature conditions which should be preferably used in connection with the method as described above in connection with FIG. 1. As shown in FIG. 2A and 2B the important temperature ranges may be considered as follows:

There is a lower temperature limit $T_C$ at which melting of crystals begins when heating the crystalline thermoplastic material in question. Below such critical temperature limit $T_C$ there is a temperature range $\alpha$ to a lower temperature limit $T_A$. In this temperature range $\alpha$ the crystalline thermoplastic material is thermally formable but such thermal forming would be almost a stretching action so that an article shaped under temperature conditions in the temperature range $\alpha$ would be more or less elastically deformed and stretched and have poor dimensional stability under heat. Thermal forming under temperature conditions below $T_A$ is practically impossible.

Above the critical temperature $T_C$ there is the critical crystalline melting temperature range extending up to an upper limit temperature $T_M$ and within this critical crystalline melting temperature range $\beta$ growth of crystals occurs when cooling down crystalline thermoplastic material through this temperature range $\beta$. Above the upper limit temperature $T_M$ of the critical crystalline melting temperature range $\beta$ for most crystalline thermoplastic materials is a temperature range $\gamma$ which in connection with the present invention has been found to be especially suitable for thermal forming. This is true especially for the lower part $\gamma_1$ of this temperature range $\gamma$ whereas the upper part $\gamma_2$ also is a suitable temperature range for thermal forming. The upper limit temperature $T_B$ of the temperature range $\gamma$ is followed by an upper temperature range $\delta$ which is especially useful for injection and extrusion processes. So FIG. 2B shows an extrusion temperature $T_E$ which is within the said upper temperature range $\delta$.

From FIG. 2A and 2B may be seen the special problem that when using an in-line process for producing articles of crystalline thermoplastic material that during such in-line process cooling down must be provided from the extrusion temperature $T_E$ to a temperature, for instance of temperature $T_A$, at which the material of the article solidifies, and which therefore requires cooling the material down through the critical temperature range $\beta$ within which growth of crystals occurs.

As may be seen from FIG. 2A within the above mentioned temperature range $\beta$, the so-called crystalline melting temperature range, substantial crystalline changes in the material occur. Such changes are melting of crystals as well as growing up of crystals. The lower limit of this critical temperature range $\beta$ may be called the critical temperature $T_C$ and the upper limit may be the crytalline melting point $T_M$. When heating the material above $T_C$ to a temperature within the crystalline melting temperature range $\beta$, the small crystals which are already contained in the cooler material begin to grow up, but on the other hand the crystals begin to melt if the material is further heated. For that reason the dotted line curve in FIG. 2A which is relative to heating the material through the range was found to be substantially flatter than the full line curves relating to cooling the material through the range. When cooling the crystalline thermoplastic material from above the crystalline melting point $T_M$ through the critical temperature range $\beta$ to a temperature lower than the critical temperature $T_C$ at first the material is in an amorphous condition. When the material reaches temperatures within the said critical temperature range $\beta$ where crystals begin to develop and to grow. The growth of crystals and the final size which the crystals will reach by such cooling depends on the length of time period during which the temperature of the material is within the said critical temperature range $\beta$. This time may be determined by cooling rates. This may be seen by the three different curves S for cooling slowly, M for medium cooling rate, and R for cooling rapidly, shown in FIG. 2A.

Therefore it is possible to control the growth of crystals in a crystalline thermoplastic material by using a predetermined cooling rate within the critical temperature range $\beta$. If cooling takes place slowly a relatively coarse crystalline structure of the material will be obtained, whereas if cooling takes place rapidly a relatively fine crystalline structure of the material is obtainable.

Having in mind the method described above in connection with FIG. 1 it is clear that when cooling down the material from the extrusion temperature $T_E$ to the normal room temperature of the article at any time it is necessary to cool the material through the critical temperature range $\beta$. It is therefore a special object of the present invention to find special ways by which such cooling through the critical temperature range $\beta$ can be done so as to effectively control the growth of crystals in the material in any desired manner.

FIG. 2B shows a preferred possibility for such cooling in which growth of crystals in the outer layers of the web material is intended to be avoided as much as possible. Therefore the thermoplastic material is heated for extrusion such that it flows out from the coat-hanger nozzle 2 at an extrusion temperature $T_E$ substantially above the crystalline melting point $T_M$. This is shown by curve E in FIG. 2B. During the stabilizing step which is illustrated by the different cooling rate curves G the outer layers of the web are cooled down rapidly and so much that their temperature is very much lower than the critical Temperature $T_C$ whereas the core material is cooled to a temperature which is in any case above the crystalline melting point $T_M$. As shown in FIG. 2B by the several curves different pre-cooling conditions may be used so that the temperature profile of the core material may vary within some limits. But in any case the core material temperature has to be retained above the crystalline melting point $T_M$. By such processing only some transition regions between the cooled outer layers and the core material will have a temperature between $T_C$ and $T_M$. Normally the thickness of such transition regions is very small, but as shown by the several curves G there is some possibility to make such regions more or less thicker by the used pre-cooling conditions and the used pre-cooling rate at the stabilizing step or by providing an outer surface temperature of the web which is nearer to the critical temperature $T_C$ than as shown in FIG. 2B.

As shown by curve H in FIG. 2B the thermoforming step should contain a very rapid cooling so that the core material distributed between the outer surface regions of the web will become rapidly cooled down through the critical temperature and to a temperature lower than the critical temperature $T_C$. Such possibility is given by the fact that during thermal forming the thickness of the web is much reduced to get the final wall thickness of the article and so the cooling effect is obtained in the inner core region whenever the thermoplastic material has relatively low heat conductivity. It was found in connection with the present invention that the cooling down rate in the core material can be so controlled that the growth of crystals can be practically minimized during cooling in the thermal forming step. On the other hand if it is intended for any reason to obtain some coarser crystalline structure in the core of the article wall the cooling rate may be controlled to be slower so that the crystalline material in the core has time enough for some growth of crystals. In connection with the present invention for any given material a predetermined rate of cooling in the thermal forming step may be provided in view of the desired control of growth of crystals in the core material.

Figure 3:
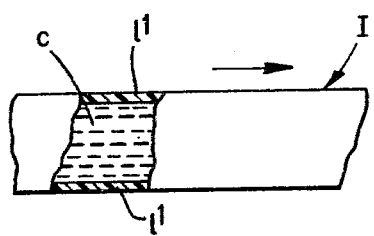
FIG. 3 is an enlarged fragmentary view partly in section illustrating internal web conditions.
Figure 4A:
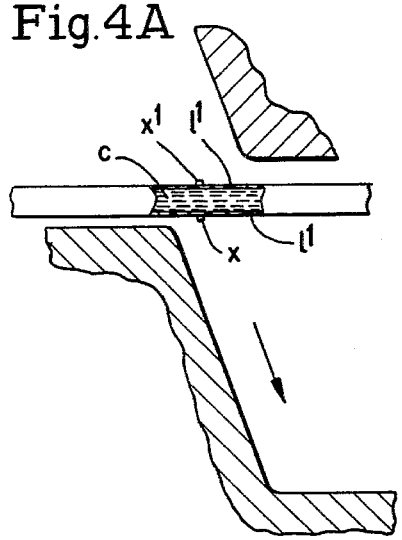
FIGS. 4A and 4B are enlarged fragmentary views in section illustrating web shaping operations in the method according to FIG. 1.
Figure 4B:
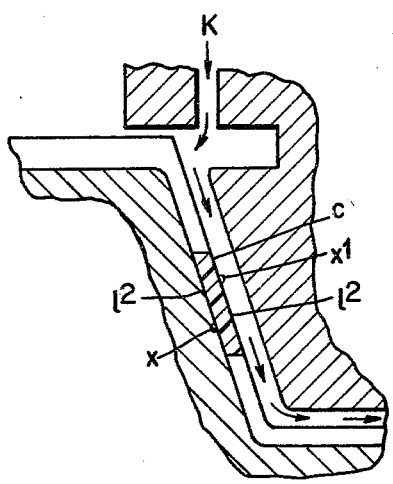

FIG. 3 shows a web having outer solidified supportive layers 1¹ and plastic core material C having a temperature above the crystalline melting point $T_M$. As shown in FIG. 4A and FIG. 4B the web thickness is substantially reduced during the thermal forming step and so the hotter inner core material when distributed between the outer layers or regions 1¹ becomes a relatively thin inner layer, so that it is possible to cool down rapidly such thin inner layer material during the thermal forming step. Thereby it is possible to provide a cooling down rate through the critical temperature range $\beta$ (FIG. 2B) such that growth of crystals can be sufficiently controlled. In order to improve cooling at the surface which is not in contact with the cooled tool surface liquid or gaseous cooling medium or powdered dry ice may be introduced into the shaping tool at K (FIG. 4B).

After the articles have been shaped the web may be fed into a trimming station 7 to cut out the shaped articles from the web or they may be trimmed out while in the forming tool. The residual web is brought to a receiving station 8 provided with a suitable device 81 for reducing the web material into granular form, so that this residual material may be fed back and recycled through a metering device 82 to mix with fresh material at the extrusion device 1 in a predetermined ratio.

In this first embodiment illustrated in FIG. 1 to 5 crystalline thermoplastic material of different kinds may be used. In a special preferred example the material may be an isotactic polypropylene having a crystallinity in the range of 60% to 70% and a crystalline melting temperature range of 160° to 170° C. The web will be extruded at temperatures in the range between 220° C. and 250° C. After stabilizing the web will have a temperature at its outer layers and surfaces of about 120° C. and a temperature in the core material in the range of 170° to 200° C. Immediately before entering the thermal forming step the temperature at the outer surfaces of the web will be about 130° to 160° C. due to heat migrating from the core and the core material will be at about 170° to 200° C.

If the polypropylene material used in the present method will have a crystalline melting point lower than 160° to 170° C., the extrusion temperature and the temperature of the core material and the temperature at the outer surfaces of the web can be adequately provided at lower levels. Normally the crystalline melting point of each material to be used is known and listed by the producer of the material but in any case it is possible to find the crystalline melting point of a material to be used by some adequate checking which can be easily made.

Figure 5:
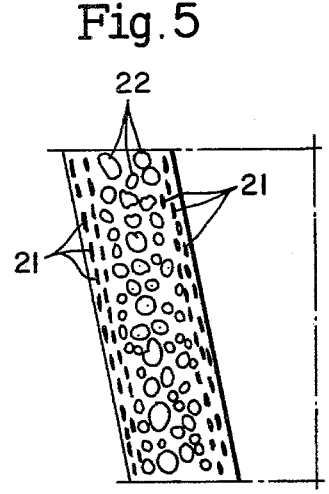
FIG. 5 is a still more enlarged fragmentary view in section illustrating crystalline conditions in the wall of an article shaped in a method according to FIG. 1.

FIG. 5 shows in a highly enlarged scale a section through the wall of an article made under the conditions of the preferred manner of execution of the present invention. Caused by the fact that the material in the outer layers of the web had been pre-cooled to a temperature lower than the lower limit of the crystalline melting temperature range by a high cooling rate only relatively small crystals had the chance to develop in said outer surface region material. Further by maintaining the said outer surface region material at such low temperature during the thermal forming step those outer regions had been shaped substantially by stretching. So the outer regions of the article wall contain a fine structure of small crystals 21 which had been oriented by stretching during the thermal forming step. In the core material at first no growth of crystals could occur because such material was held at a temperature above the upper limit $T_M$ of the crystalline melting temperature range $\beta$ before entering the thermal forming step. But during the thermal forming step cooling occured in the inner core material at a somewhat slower cooling rate than took place at the outer surface regions. So in the core region of the article wall medium size crystals 22 developed. As such crystal development occured during and after the distribution of the plastic core material within the outer surface regions no stretching effect had occured in the material at these crystals 22. By such pre-cooling and thermal forming steps the article wall had a core material region having a medium crystallinity and containing medium size crystals. So a maximum of stiffness of this inner core of the wall article is obtained. On the other hand the outer layers or surface regions of the article wall contain a fine crystalline structure stretched during thermal forming, so that the outer layers or outer surface regions of the wall have an increased ductility and an increased impact strength.

Figure 8A:
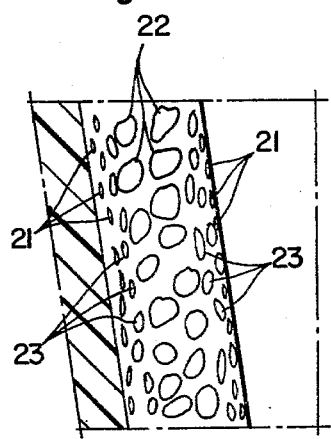
FIGS. 8A, 8B and 8C are enlarged fragmentary views in section similar to FIG. 5, but showing the article wall obtained under conditions according to FIGS. 7(A), (B) and (C) respectively.
Figure 7A:
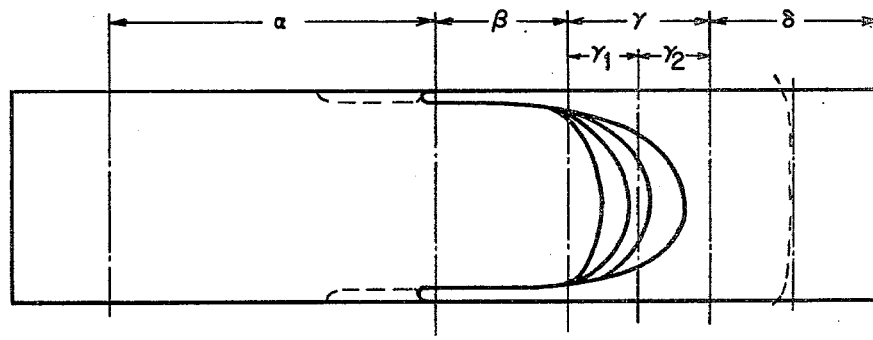
FIGS. 7A, 7B and 7C are graphic views relating to reheating the outer surface layers of the web.

The above described preferred embodiment of the method may be varied by reheating the outer surface layers by external means immediately before thermal forming. So FIG. 7A and FIG. 8A show a possibility to reheat the outer surface layers of the web by external means immediately before entering the thermal forming step such that the temperature at these outer surface layers is adjacent to but lower than the lower limit $T_C$ of the crystalline melting temperature range $\beta$. Such reheating may be desirable in some cases for instance if special fine surface structures have to be formed at the article surface.

Figure 6:
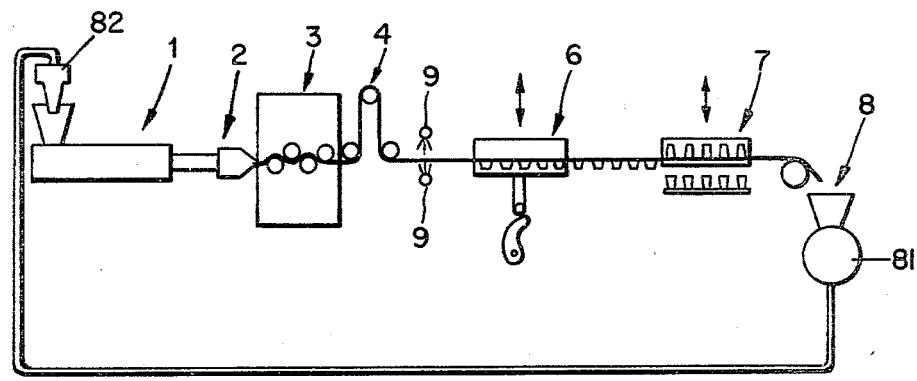
FIG. 6 is a diagrammatic view showing a second possibility for the method according to the invention in which a reheating step is provided before the web enters the thermal forming station.

Such reheating may be done in an apparatus as diagrammatically shown in FIG. 6. Such apparatus is practically the same as that one of FIG. 1, except that there is a reheating means 9 provided at the entry of the thermal forming station 6.

All the other parts of the apparatus may be the same as described above in connection with FIG. 1. Therefore in FIG. 6 the same reference numbers for the same parts are used.

As may be seen from FIG. 7A surface temperature of the web is increased such that it is adjacent to but lower than the lower limit $T_C$ of the critical crystalline melting temperature range $\beta$. All the other temperature conditions may be the same as shown in connection with FIG. 2B.

As shown in FIG. 8A such reheating has some influence with respect to the structure of the finished article wall, in that the hotter core material of the web is able to rewarm the above mentioned transition regions between the inner core and the outer layers. Thereby some controlled growth of crystals can occur in these transition regions and such transition regions may become somewhat thicker. These transition regions therefore will have some equalizing function between the core and the surface layers of the article wall. FIG. 8A shows that in the inner core region crystals 22 of medium size have been produced and at outer surfaces of the stretched article wall crystals 21 of small size are present in the thermoplastic material. Between these a third type of crystals 23 is present which are somewhat larger in size than the crystals 21 of the surface regions but substantially smaller in size than the crystals 22 in the core material. But these crystals 23 of the third type are essentially unstretched and unoriented because they had been produced mainly during the said thermal forming step.

Figure 8B:
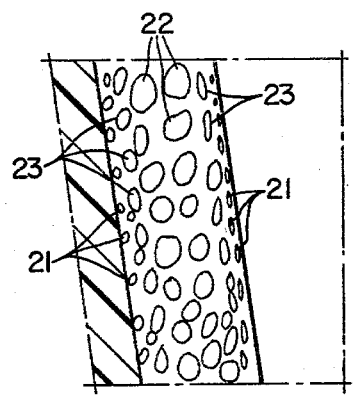
Figure 7B:
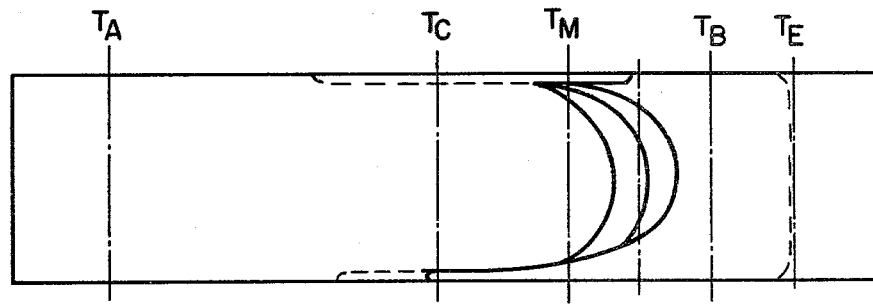

A further modification of the method is shown in connection with FIG. 7B and FIG. 8B. To produce articles under this modification the same apparatus may be used as described above in connection with FIG. 6. But in this case one surface of the web which is provided to be brought in contact with the shaping tool in the thermal forming step is reheated much more so that its temperature will assume a value above the upper limit $T_M$ of the critical crystalline melting temperature range. As shown in FIG. 7B the outer temperature of this one web surface is near to the upper limit of the upper preferred thermal forming temperature range $\gamma_1$. Therefore the thermoplastic material in this surface region comes into plastic state and must be cooled down through the critical crystalline melting temperature range $\beta$ during the thermal forming step. But such second cooling is not difficult because this thin surface layer of the web comes into contact with the cooled tool surface and will be very rapidly cooled down. As shown in FIG. 8B by such processing, the one surface of the article wall contains small crystals 21 but in unstretched condition and crystals 23 of the third type but in unstretched condition also. The second surface of the article wall has been shaped under practically the same conditions as described above in connection with FIG. 8A and so this second surface region contains small crystals 21 in stretched condition and crystals 23 of the said third type but in somewhat stretched condition. The inner core of the article wall is structured in the same manner as that of FIG. 8A this means it contains medium size crystals 22 in unstretched condition of the wall.

Figure 8C:
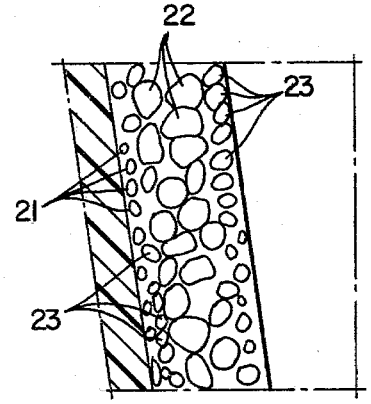
Figure 7C:
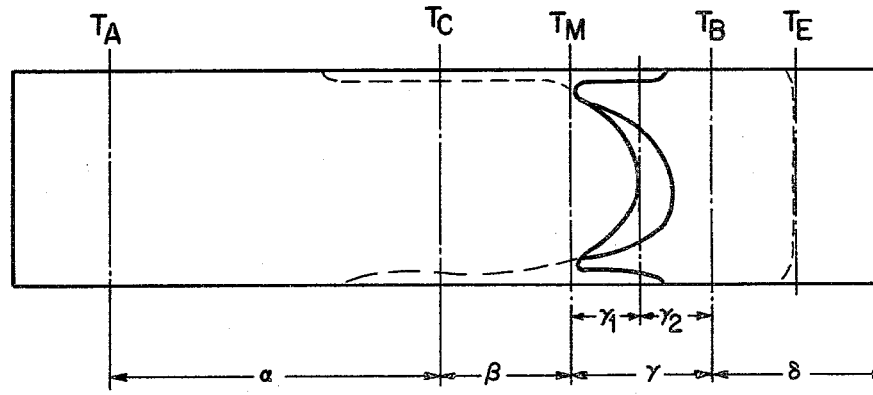

A third possible example for modification is shown in FIGS. 7C and 8C. The process means to be used are practically the same as shown in FIG. 6, but reheating by external means is made such that both of the web surfaces are reheated such as described above in connection with the one web surface of FIG. 7B to a temperature above the crystalline melting point $T_M$.

When processing in this third manner, the same conditions are provided at the wall surface formed at the cooled tool surface as in the example of FIG. 7B and FIG. 8B. So this contact shaped article wall surface contains small crystals 21 in unstretched conditions and third type crystals 23 in unstretched condition also. In contrast to the FIG. 7B and 8B embodiment, the second surface of the article wall here only contains crystals 23 of the third type which crystallized during the final cooling in the thermal forming step. The inner core of the article wall in this modification contains medium size crystals practically the same as in the examples of FIGS. 5, 8A and 8B.

If it is desired to avoid any growing up of crystals in the transition regions during the thermal forming step some modification may be provided in the thermal forming such as shown by arrows K. These arrows K mean that a fluid or particulate cooling medium may be introduced into the closed thermal forming tool and onto the one surface of the shaped article wall which is not in contact with a cooled shaping tool surface. For instance powdered dry ice may be introduced at K and blown onto the said free surface of the shaped article wall. When doing so the over all cooling of the article wall is faster. By such higher cooling rate the growth of crystals at all parts within the wall can be held reduced, so that the crystals in the core material will attain a substantially smaller size than that one as shown at 22 in FIGS. 8A, 8B and 8C.

In connection with the invention crystalline thermoplastic materials of different kinds may be used. Preferably crystalline olefine materials may be used in the present process for manufacturing articles.

Special materials suitable to be used in this connection may be:

Polyethylene (middle pressure production), having a density in the range between 0.924 and 0.945 (g/cm$^3$), a crystalline melting temperature range between 115° and 127° C. and a crystallinity of 65 to 76%.

Polyethylene (low pressure production), having a density between 0.945 and 0.965 (g/cm$^3$), a crystalline melting temperature range of 127° to 137° C. and a crystallinity of 75 to 95%.

Isotactic polypropylene having a density in the range between 0.908 and 0.905 (g/cm$^3$), a crystalline melting temperature range between 140° and 170° C. and a crystallinity of 60 to 70%.

Random copolymerisation products of ethylene and propylene.

Block compolymerisation products of ethylene and propylene.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for manufacturing thin-walled articles from crystalline thermoplastic material by thermoforming in a web or sheet of said thermoplastic material while reducing the web or sheet thickness, said thermoplastic material having a critical crystalline melting temperature range and said method further including a temperature conditioning of said web or sheet to suitable temperature conditions for thermoforming and cutting out the shaped articles from said web or sheet, characterized thereby that said temperature conditioning involves providing at the inner core of said web or sheet a temperature higher than the upper limit of said critical crystalline melting temperature range and providing at the outer surface regions of said web or sheet a temperature lower than the lower limit of said critical crystalline melting temperature range, and that in said thermoforming step the said thermoplastic material in the said core of the web or sheet or in the said shaped article wall, respectively, in combination with the said reduction in thickness of said web or sheet and subsequently of said reduction in thickness, is rapidly cooled down through the said critical crystalline melting temperature range while growth of crystals in the said core material is controlled.

2. The method defined in claim 1 wherein the temperature provided at the core material of the said web or sheet is close to but higher than the upper limit of the critical crystalline melting temperature range of the said crystalline thermoplastic material.

3. The method defined in claim 1 wherein the temperature provided at the outer surface regions of the said web or sheet is close to but lower than the lower limit of the critical crystalline melting temperature range of the said crystalline thermoplastic material.

4. The method defined in claim 1 wherein said temperature conditioning for thermoforming includes heating a web or sheet of said thermoplastic material through to a temperature higher than the upper limit of said critical crystalline melting temperature range and cooling down under predetermined cooling rate conditions the said outer surface regions of said web or sheet to a temperature lower than the lower limit of said critical melting temperature range, said cooling rate conditions being adapted for controlling growth of crystals in the material of the said outer surface regions of the web or sheet.

5. The method defined in claim 1, characterized by an uninterrupted sequence of steps comprising:
    (a) extruding a continuous web of hot said crystalline thermoplastic material at a conventional extrusion temperature above the crystalline melting temperature range,
    (b) substantially immediately rapidly precooling the opposite surface of said web to form along said surfaces thin supportive layers having a temperature in the range wherein the said material is not further plastically deformable and wherein further growth of crystals is essentially avoided, while the hotter core material between said layers is cooled to a temperature adjacent to but above the crystalline melting temperature range and is held in a substantially crystal free condition,
    (c) transporting the so precooled web into a thermoforming station within a sufficiently short time period to essentially maintain over the web thickness the above mentioned temperature profile produced by precooling, and
    (d) then thermally forming at a rapid cooling rate said web to an article of desired shape to essentially control growth of crystals in said material while cooling through said crystalline melting temperature range under cooling rate conditions.

6. The method defined in claim 5 wherein the said precooling at the opposite surfaces of said web is such that growth of crystals in the material of said thin supportive layers is essentially avoided during said precooling, while the hotter core material between said layers remains at a temperature above the crystalline melting temperature range and in a crystal free condition.

7. The method defined in claim 5 wherein rapidly cooling said web during said thermally forming to an article of desired shape is such that growth of crystals is essentially avoided, or so controlled that only relatively small crystals will be developed during said thermally forming.

8. The method defined in claim 1 wherein the web or sheet is subjected to a forming tool operation for thermoforming in which the said outer surface regions are shaped practically by elastic deformation which is stabalized by final cooling of the article, whereas the warmer core is deformed in a plastic state between the said outer surface regions to produce an inner wall layer of the article free of oriented crystals, the maximum average size of said crystals being controlled by said cooling rate during the said thermoforming step.

9. The method defined in claim 1 wherein the thermoplastic material is isotactic polypropylene, the extrusion temperature being within the range of 220° C. to 250° C., and the web entering the shaping tool operation has a core temperature in the range of 170° C. to 200° C. and the outer layer temperature in the range of 130° C. to 160° C.

10. The method as defined in claim 1 wherein the thermoplastic material is a low pressure produced polyethylene having a density of 0.945 to 0.965 g/cm$^3$ and a crystallinity of 75% to 95%.

11. The method as defined in claim 1 wherein the thermoplastic material is a random co-polymerisation product of ethylene and propylene.

12. The method as defined in claim 1 wherein the thermoplastic material is a block co-polymerisation product of ethylene and propylene.

13. The method as defined in claim 1 wherein temperature conditioning of the web is obtained by contact of the web surfaces with the cooled surfaces of heat conducting cooling members.

14. The method defined in claim 1 wherein one web surface region is cooled during thermoforming by contact with a cooled tool surface and during the web surface not in contact with the cooled tool is cooled by contact with a fluent cooling medium.

15. The method as defined in claim 14 wherein cooling of the said web surface not in contact with the cooled tool is obtained by contact with a powdered dry ice blown thereon.

16. The method as defined in claim 1 wherein immediately before entering the said thermoforming step the web of crystalline thermoplastic material cooled at one or both of its surfaces is reheated by external means to a temperature adjacent to but below the lower limit of said crystalline melting temperature range.

17. The method defined in claim 1 wherein immediately before entering the said thermoforming step the web of crystalline thermoplastic material cooled at one or both of its surfaces is reheated by external means to a temperature within the said crystalline melting temperature range.

18. The method defined in claim 1 wherein immediatly before entering the said thermoforming step the web of crystalline thermoplastic material cooled at one or both of its surfaces is reheated by external means to a temperature above the upper limit of said crystalline melting temperature range.

* * * * *

UNITED STATES PATENT AND TRADEMARK OFFICE
CERTIFICATE OF CORRECTION

PATENT NO. : 4,234,530
DATED : November 18, 1980
INVENTOR(S) : Alfons W. Thiel et al It is certified that error appears in the above-identified patent and that said Letters Patent are hereby corrected as shown below:

In the references cited:

Line 3, "4,039,609 3/1977" should be --4,039,609 8/1977--.

Add foreign reference --2,116,487 7/1972 France Schell Int.--

Column 4, line 24 "so-called" should be --So-called--.

Signed and Sealed this

Eighth Day of September 1981

[SEAL]

Attest:

Attesting Officer

GERALD J. MOSSINGHOFF

Commissioner of Patents and Trademarks